United States Patent
Barber

[15] 3,675,107
[45] July 4, 1972

[54] TURRET INDEXING CONTROL SYSTEM
[72] Inventor: Joseph J. Barber, Williamsville, N.Y.
[73] Assignee: Houdaille Industries, Inc., Buffalo, N.Y.
[22] Filed: Oct. 1, 1970
[21] Appl. No.: 77,139

[52] U.S. Cl. ............................................318/601, 318/603
[51] Int. Cl. ..........................................................G05b 19/28
[58] Field of Search .........................................318/601, 603

[56] References Cited

UNITED STATES PATENTS

| | | | |
|---|---|---|---|
| 3,569,815 | 3/1971 | McNaughton | 318/601 |
| 3,333,089 | 7/1967 | Saylor et al. | 318/601 X |
| 3,448,360 | 6/1969 | Pohl | 318/601 |
| 3,492,467 | 1/1970 | Caban et al. | 318/603 X |
| 3,517,286 | 6/1970 | Stobbe | 318/603 X |
| 3,523,229 | 8/1970 | Black et al. | 318/601 |

Primary Examiner—Benjamin Dobeck
Attorney—Hill, Sherman, Meroni, Gross & Simpson

[57] ABSTRACT

For controlling indexing of the turret of a punching press where tool stations have different distances therebetween, a read only memory stores the number of indexing pulses required to index between each pair of adjacent stations, and a readout circuit serves to read out the number of such pulses required to execute a desired indexing operation. Preferably the system executes a move in the indexing direction requiring traversal of the lesser number of tool stations.

4 Claims, 3 Drawing Figures

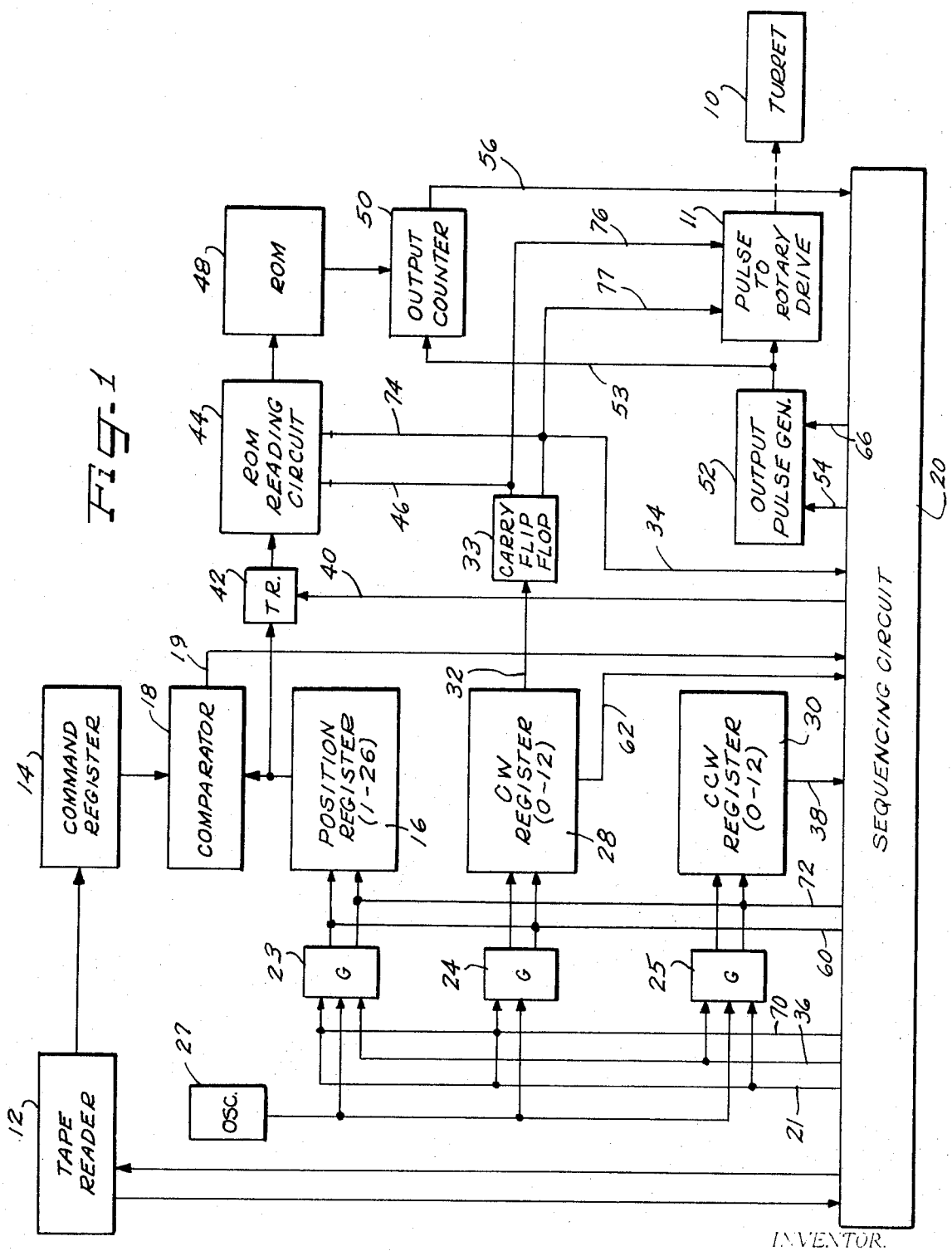

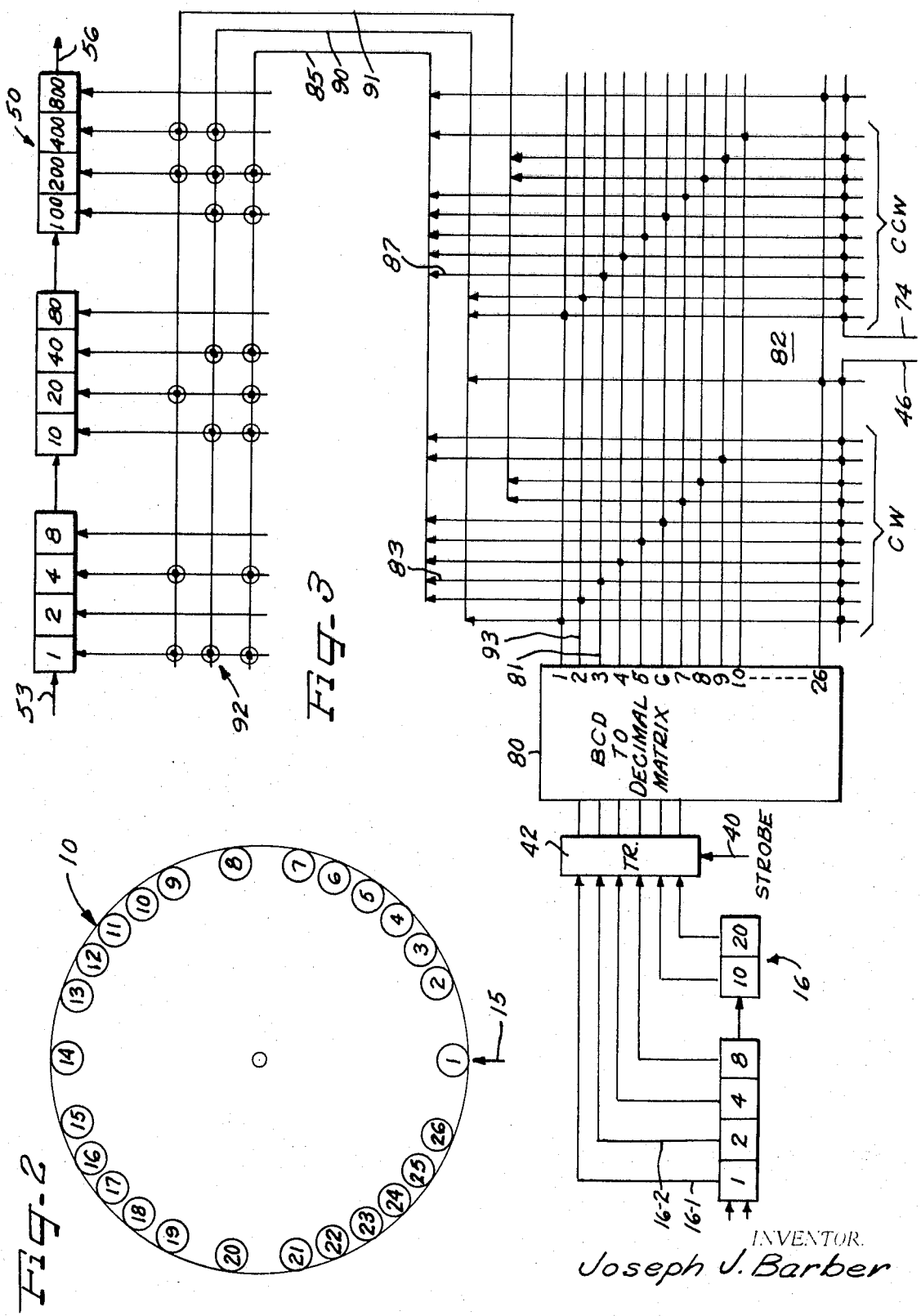

3,675,107

TURRET INDEXING CONTROL SYSTEM

SUMMARY OF THE INVENTION

This invention relates to an indexing control system and particularly to a bidirectional rotary indexing system for the turret of a punching press or the like.

It is an object of the present invention to provide an indexing control system applicable to rotary turrets and the like having unequal spacing between certain of the successive indexing stations.

A further object of the invention is to provide a bidirectional rotary indexing control system capable of comparing present and commanded positions and determining the indexing direction requiring the traversal of the lesser number of intervening stations.

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure.

BRIEF DESCRIPTION OF THE DRAWINGS

FIG. 1 is a schematic diagram illustrating an embodiment of the present invention;

FIG. 2 is a diagrammatic illustration of an exemplary rotary turret for a punching press and having 26 tool locations; and FIG. 3 is a detailed diagram of an exemplary read only memory and associated circuits for the system of FIG. 1.

DETAILED DESCRIPTION OF THE PREFERRED EMBODIMENT

The present invention has particular application to a turret type punching press including a turret such as indicated at 10 in FIG. 1 and such as indicated diagrammatically in FIG. 2. The illustrated turret is shown with a series of tool locations identified by decimal numbers 1 through 26. By way of example, the turret may be driven by means of an open loop indexing drive including a pulse to rotary component 11 which may be of conventional configuration. Where the stations of the turret 10 are unequally spaced, the total indexing distance may be divided into an equal number of increments such that the successive stations fall at integral numbers of such increments. Further, the pulse to rotary drive component 11 may respond to each electrical pulse supplied thereto to move the turret a distance corresponding to one increment. In one practical embodiment, certain of the tool stations were unequally spaced, with spacings corresponding to 750 increments or pulses separating stations No. 26, No. 1 and No. 2, with 625 increments or pulses separating stations No. 7, 8, 9 and No. 13, 14 and 15, and No. 19, 20 and 21, and with the remaining stations having a spacing corresponding to 375 increments or pulses.

In a specific system as illustrated in FIG. 1, a tape reader 12 supplies coded command signals to command register 14 for directing the system to index the turret 10 to a new position. By way of example, the command signal in register 14 may be a binary coded decimal representation of the decimal number assigned to the new tool location, signifying that such tool location is to be indexed to an operating position as represented at 15 in FIG. 2.

Position register 16 in the illustrated embodiment is an up-down binary coded decimal counter capable of counting from 1 to 26, so as to maintain a count corresponding to the indexing position of the turret 10. A comparator 18 is coupled to the respective corresponding stages of the command register 14 and the position register or counter 16 and supplies an output signal which is at one logical level when the numbers in the command and position registers are equal and which is at a different logical level when the numbers in the respective registers are unequal. Thus, when a new command signal is supplied by the tape reader 12 to the command register 14, the condition of comparator output line 19 will cause an indexing cycle to be initiated.

When the tape reader has completed the reading of a new command into the command register 14, sequencing circuit 20, operating in a conventional manner, responds to the signal at comparator line 19 to supply an enabling potential to gate control line 21, so that gates 23–25 transmit pulses from oscillator component 27 to position register 16, CW register 28 and CCW register 30. In the illustrated embodiment, registers 28 and 30 are updown counters with a capacity to count from 0 to 12. Gate control line 21 is so connected as to cause position register 16 and CW register 28 to count in the up or positive direction, while causing the CCW 30 to count in the down or negative direction (that is from 0 to 12 to 11 to 10, etc.). If the turret 10 is initially at position number 1 as indicated in FIG. 2, position register 16 will count from 1 in the positive direction until the count in the position register 16 reaches a count corresponding to that in the command register 14, at which time the sequencing circuit 20 is signalled via comparator output line 19 to disable gate control line 21.

If, for example, the commanded position had been position number 13, oscillator 27 would have supplied 12 pulses to position register 16 before gates 23–25 were disabled, so that position register 16 would register a count of 13 corresponding to that in the command register 14. In this event, the CW register would register a count of 12, and there would have been no carry pulse at register output line 32, with the result that the carry flip flop component 33 would remain in its initial reset condition. The CCW register 30 would have counted down to a count of 1 in response to the 12 pulses from oscillator 27. The sequencing circuit 20 now checks the condition of carry flip flop output line 34 to determine if a carry pulse has been emitted from the CW register 28. In the example given, the output line 34 would be at a logical level corresponding to the reset condition of carry flip flop 33, and would cause the sequencing circuit 20 to then enable gate control line 36. Oscillator 27 would now supply the pulses to registers 16 and 30, gate control line 36 causing register 16 to be counted in the down or negative direction, while causing CCW register 30 to be counted in the up or positive direction. The output line 38 from register 30 supplies a logical signal to the sequencing circuit 20 at such time as the CCW register reaches a count of zero. Since the CCW register is initially at a count of 1, this requires 12 pulses from oscillator 27, which 12 pulses return the position register to its initial count of 1. The logical signal at output line 38 causes sequencing circuit 20 to emit a strobe pulse at transfer control line 40 so as to momentarily enable the transfer gate component 42. This action serves to transfer the initial count of position register 16 to the input of the ROM readout circuit 44. The circuit 44 also receives a logical signal via line 46 from the reset output of flip flop 33, signalling that the turret is to be indexed in the positive or clockwise direction as viewed in FIG. 2. The readout circuit 44 causes the read only memory 48 to supply to output counter 50 a coded number corresponding to the number of increments or pulses required to traverse from station number 1 to station number 2. Thus, memory component 48 may supply to output counter 50 the decimal count of 750 in binary coded decimal form. At this point, sequencing circuit 20 may activate output pulse generator component 52 via control line 54 so as to cause the supply of a train of pulses to the drive component 11. The pulses are also supplied via line 53 so as to cause the output counter 50 to count down from the initial count of 750, the counter 50 supplying an output at line 56 when the counter has counted down to a count of zero. When 750 pulses have been supplied to counter 50 and drive component 11, the sequencing circuit 20 responds to the logical signal at line 56 to discontinue the enabling potential at line 54 and thus to discontinue the supply of indexing pulses from the generator 52.

Also in response to the zero count signal at line 56, sequencing circuit 20 supplies a pulse to line 60 leading to the inputs of position register 16 and CW register 28. The line 60 is so connected as to cause the position register 16 to count up to a count of 2, while the CW register 28 is counted down to a count of 11. The sequencing circuit then again actuates transfer control line 40 to cause the transfer from memory 48 to the counter 50 of a number corresponding to the number of indexing increments from station number 2 to station number 3, for example the number 375. The output pulse generator 52 is then again activated to supply pulses to the drive component 11 and to the counter 50 until a total of 375 pulses have been supplied causing the turret to index from position number 2 to position number 3.

It will be observed that the count in the CW register may be transmitted via cable 62 to the sequencing circuit 20 so that the sequencing circuit can determine the number of remaining stations to be traversed in executing a given command. If, for example, the output line 32 from the CW register is applied to a set input (rather than a binary or toggle input) of flip flop 33, the fact that the flip flop 33 remains reset will signify that the CW register 28 contains the number which is pertinent. In this event, the sequencing circuit can respond to numbers in the CW register 28 which are below six, for example, to cause pulse generator 52 to thereafter supply pulses at a reduced pulse rate. This feature is optional, since circuit 20 may always actuate the pulse generator at the lower pulse rate via line 66, regardless of the number of indexing stations remaining to be traversed.

The indexing operation continues step by step, supplying the successive numbers of increments for indexing between the successive stations to the output counter 50, as has been described with respect to indexing from station 1 to station 2 and from station 2 to station 3. When the turret has reached position number 12, the position register 16 contains count of 12, while the CW register 28 contains a count of 1. Sequencing circuit 20 again triggers transfer line 40 to transfer a number corresponding to the number of required pulses for traversing from position 12 to position 13, for example 375. When the turret reaches position 13, the zero signal at counter output line 56 causes sequencing circuit 20 to transmit a pulse to line 60 so that position register 16 now registers a count of 13 and CW register 28 registers a count of zero. The sequencing circuit may be so designed as to first transmit the pulse to line 60 and then to transmit a pulse to line 40 only if comparator output line 19 is in the non-equality indicating condition. In this case, when the position register 16 registers a count of 13, the comparator 18 will transmit an equality signal via line 19 inhibiting the further activation of transfer gate 42. The sequencing circuit 20 may respond to the equality signal at comparator output line 19 and the zero condition of the CW register 28 as determined from line 62 to emit a signal indicating that the indexing cycle is complete. This signal may be used by the overall control system for a punching press, for example, as a condition for executing a punching operation. Once the punching operation has been completed, the sequencing circuit may receive a signal and reactivate the tape reader 12. Normally the tape reader will read coded command signals for the overall system directing positioning operations of the work table, as well as punching and turret indexing operations. The record tape is coded in a conventional manner so that instructions with respect to turret indexing will be supplied to the command register 14.

The design of a sequencing circuit 20 for effecting the indicated sequence of operation is a routine matter forming no part of the present invention, and it is deemed that an illustration of details of this type would only serve to obscure a proper disclosure of the present invention.

As another example of the operation of the system of FIG. 1, if the turret 10 is initially in position 1 as shown in FIG. 2, and the command register 14 receives a command to index to position number 14, the non-equality signal at comparator output line 19 again causes sequencing circuit 20 to activate line 21, whereupon the position register 16 is counted up to a count of 14, requiring a total of 13 pulses from oscillator 27. The supply of 13 pulses from oscillator 27 via gate 24 to CW register 28, causes register 28 to count up through 12 and then back to zero, emitting a carry pulse at output line 32 to the set input of carry flip flop 33. The CW register thus contains a count of zero, and the flip flop 33 is in the set condition, providing a characteristic logical signal level at the set output line 34 (representing a logical one or "true" condition of the set output line).

With the carry flip flop 33 in set condition, sequencing circuit 20 is now operative to activate gate enabling line 70 causing pulses to be supplied to registers 16 and 28 in such a way as to count the registers in the positive or up direction. Where the cable 62 includes a conductor for representing the condition of each stage of the register 28, the sequencing circuit 20 may include logical AND circuitry for transmitting a momentary pulse at the instant when register 28 reaches a zero count. At this point in the cycle, sequencing circuit 20 will respond to such momentary pulse to deactivate gate control line 70, interrupting the counting of registers 16 and 28. The position register 16 having received 13 pulses will have counted from a count of 14 in the positive direction through the maximum count of 26 and back to a count of 1, representing the present position of the turret 10. The CCW register 30 remains at a count of zero which under these circumstances should be interpreted by the sequencing circuit 20 as a maximum count, representing the requirement that 13 indexing stations be traversed to move the turret to the commanded position. It will be noted that the cable 38 may include lines from the respective stages of the register 30, and the sequencing circuit 20 may include logical AND gate circuitry for supplying a static or constant amplitude logical signal so long as the CCW register is at a zero count. Thus, the sequencing circuit 20 responds to the fact that the flip flop 33 is in set condition and to the fact that the CCW register is at the zero count as indicated by the resulting static logical signal, to evaluate the signal at line 38 as representing that the turret has 13 indexing stations to traverse before reaching the commanded position.

The sequencing circuit 20 may respond to the fact that the CW register 28 has reached a zero count, and the lack of an equality signal at the comparator output 19 to send a transfer pulse to line 40. The circuit 44 responds to the count in the position register 16 (corresponding to position number 1) and to the condition of the set output line 74 from carry flip flop 33 to cause memory component 48 to load into counter 50 a number corresponding to the indexing distance between station number 1 and station number 26, for example the number 750. The drive component 11 is shown as receiving logical signals via reset line 76 and set line 77 from flip flop 33 so as to determine the direction of drive of the turret 10 when pulse generator 52 is activated. Where flip flop 33 is set, the logical one signal at line 77 causes drive component 11 to index the turret 10 in the counterclockwise direction as viewed in FIG. 2, so that the turret moves from position 1 to position 26 as counter 50 is counted down from 750 to 0. The zero condition signal at line 56 causes sequencing circuit 20 to supply a pulse to line 80 (in view of the set condition of flip flop 33 as signalled by the logical one condition of line 34). The position register 16 thus is counted down to a count of 26, while the CCW register is counted down to a count of 12, indicating that 12 further indexing movements are required. Since the comparator output line 19 continues to indicate an inequality between the numbers in registers 14 and 16, the sequencing circuit again actuates transfer gate component 42, causing the turret to be indexed from position 26 to position 25. At the completion of this indexing movement, line 80 is again actuated to count the position register down to a count of 25 and to count the CCW register down to a count of 11. This indexing sequence continues until the sequencing circuit reduces the count in position register 16 to a count of 14, whereupon the comparator 18 supplies an equality signal to line 19, preventing further actuation of the transfer gate 42, and causing the sequencing circuit 20 to issue a signal indicating that turret indexing movement has been completed.

As one further example, suppose that the turret is at position number 1 as indicated in FIG. 2, and a command corresponding to the decimal number 26 is received by the command register 14. In this event, activation of line 21 results in the supply of 25 pulses from oscillator 27 to registers 16, 28 and 30. Thus, at the completion of the activation of line 21, position register 16 would be at a count of 26, CW register 28 would be at a count of 12 (having emitted a carry signal to set flip flop 33), and CCW register 30 would be at a count of 1. Because of the set condition of flip flop 33, enabling line 70 is activated, causing registers 16 and 28 to be counted in the up direction. After one pulse from oscillator 27, position register 16 would have counted from a count of 26 to a count of 1, while the CW register 28 would have counted from a count of 12 to a count of 0.

When counter 28 reaches a count of zero, sequencing circuit 20 responds to generate a momentary pulse, which serves to actuate transfer gate 42. The one count in position register 16 results in the loading of a count of 750 into the counter 50, so that 750 pulses are supplied to the drive component 11, which actuates the turret 10 in the counterclockwise direction in response to the logical one signal at control line 77. The signal at line 56 from counter 50 causes line 80 to be pulsed, shifting position register 16 to a count of 26 and the CCW register to a count of zero. The comparator 18 now transmits a signal to line 19 indicating the equality of the numbers in registers 14 and 16, causing the sequencing circuit to signal that the indexing cycle is complete.

FIG. 3 shows exemplary details for components 42, 44 and 48 of FIG. 1. Thus, the successive stages of register 16 are indicated as comprising a binary coded decimal counter with six stages representing respectively binary weights of 1, 2, 4, 8 and 10, 20. Output lines from the respective stages are shown as being connected with a binary coded decimal to decimal matrix component 80 under the control of the transfer gate 42. At the output of the component 80, the successive decimal output lines represent respective count values between 1 and 26, the counter 16 being connected to count from the value 26 to the value 1 when counting in the positive direction, and to count from the value 1 to the value 26 when counting in the negative direction. Thus, for example, if counter 16 registers a count value of 3 at the time that the transfer gate 42 is activated, counter output lines 16–1 and 16–2 will be at a logical one signal level, causing a logical one signal level to appear at output line 81 of component 80. The schematic matrix arrangement indicated at 82 is a diagrammatic illustration of a logical AND network wherein a given vertical line will be at a logical one representing condition if each of the horizontal lines which is shown coupled therewith by means of a dot is in the logical one representing condition. Thus, for example, if a logical one signal level appears at output line 81 and at line 46, a logical one signal level will appear at vertical line 83 and be transmitted via common line 85. Alternatively, if line 81 is at a logical one signal level and conductor 74 is at a logical one signal level, vertical line 87 will be at a logical one signal level which is transmitted to the common conductor 85. It will be noted that there are three common output conductors from the matrix arrangement 82, namely conductors 85, 90 and 91. These common conductors in turn lead to a logical OR network indicated at 92, which controls the number introduced into the output counter 50. Thus, for example, if common conductor 85 is at a logical one signal level, this will cause the setting of stages 1, 4, 10, 20, 40, 100 and 200 of counter 50, so as to introduce into the counter a decimal count of 375. Thus if the position counter 16 registers a count of 3, and gate 42 is activated, the logical one signal level appearing at common output conductor 85 will serve to introduce a count of 375 into the output counter 50, representing the number of pulses required to index the turret 10 from position number 3 to position number 4 (where conductor 46 is active) or from position number 3 to position number 2 (where conductor 74 is active).

As another example, if position counter 16 registered a count of 2, output line 93 of component 80 would be in a logical one representing condition, so as to activate common output conductor 85 for the case of clockwise indexing, and so as to activate common output conductor 90 for the case of counterclockwise indexing. Thus the indexing distance between position number 2 and position number 3 corresponds to 375 pulses, while the indexing distance from position number 2 to position number 1 is a different value as determined by the coupling of common output conductor 90. Specifically, conductor 90 is connected with stages 10, 40, 100, 200 and 400 of output counter 50 so as to set a value of 750 into counter 50 for the case of indexing from position number 2 to position number 1, for example. The indexing distance between position number 7 and position number 8 corresponds to 625 pulses, so that when common output conductor 91 is activated, counter 50 is set to a count of 625. It will be observed that the logical OR function of matrix 92 is represented by the small circles at the pertinent intersection points of the matrix.

Simply by way of example, the various logical AND and logical OR functions represented respectively by matrices 82 and 92 may actually be carried out by conventional transistor gate circuits, or other suitable form of read only memory components.

I claim as my invention:

1. A bidirectional rotary indexing control system for controlling indexing between stations comprising
   a command register for receiving coded command signals in accordance with desired indexing movements,
   a position register for indicating an initial count value corresponding to a present position,
   further register means having a count capacity substantially corresponding to 180° of indexing movement,
   means connected to the position register and to the further register means for causing the position register to count from its initial count value to a count value corresponding to the command signal in the command register and for causing the further register means to count in step with the counting of said position register, and
   means for sensing when the register means counts beyond its count capacity, and comprising carry responsive means for assuming a first logical condition in the absence of a count overflow and for assuming a second logical condition in the event of a count overflow of said register means, and
   means controlled by the first and second logical conditions for controlling the direction of indexing movement so as to avoid indexing movements substantially exceeding 180°.

2. A control system in accordance with claim 1 with said register means comprising first and second counters which are caused to count in an up and in a down direction respectively in step with the position register, one of said first and second counters thereby registering the number of indexing stations to be traversed, regardless of the indexing direction as determined by said first and second logical conditions.

3. An indexing control system for controlling indexing between stations some of which have different spacings therebetween, comprising
   a memory having stored therein different numbers, the respective different stored numbers representing respective numbers of equal indexing increments corresponding to the respective different spacings between respective different successive pairs of stations,
   readout means connected with said memory for controlling readout therefrom and responsive to a command signal to successively read from said memory respective stored numbers representing the respective numbers of indexing increments needed to traverse successive pairs of stations lying between a present position and a new position represented by said command signal, and
   output means connected with said memory and controlled by the successive numbers of indexing increments supplied therefrom for producing proportional indexing movement so as to effect indexing from the present position to the new position represented by said command signal.

4. An indexing control system in accordance with claim 3 with said memory having respective inputs representing the successive pairs of stations and having outputs for supplying coded signals in accordance with the respective stored numbers in said memory and operable in response to actuation of one of said inputs representing a selected pair of stations to supply the coded signal in accordance with the corresponding stored number, and said output means comprising an output counter connected with said memory for receiving said coded signals therefrom to register the corresponding stored number, and means for converting the stored number registered by said output counter into a corresponding pulse train wherein each pulse represents one of said indexing increments and the total number of pulses of said pulse train represents the spacing between the selected pair of stations.

* * * * *